US008099238B2

(12) United States Patent
Wistrand

(10) Patent No.: US 8,099,238 B2
(45) Date of Patent: Jan. 17, 2012

(54) STATEFUL, DOUBLE-BUFFERED DYNAMIC NAVIGATION VOICE PROMPTING

(75) Inventor: Eric Wistrand, Antioch, CA (US)

(73) Assignee: TeleCommunication Systems, Inc., Annapolis, MD (US)

(*) Notice: Subject to any disclaimer, the term of this patent is extended or adjusted under 35 U.S.C. 154(b) by 691 days.

(21) Appl. No.: 12/285,978

(22) Filed: Oct. 17, 2008

(65) Prior Publication Data

US 2009/0125227 A1    May 14, 2009

Related U.S. Application Data

(60) Provisional application No. 60/996,373, filed on Nov. 14, 2007.

(51) Int. Cl.
*G01C 21/00* (2006.01)
(52) U.S. Cl. .......................... 701/431; 701/428; 707/920
(58) Field of Classification Search .................. 701/211, 701/200, 201, 202, 207, 208, 209; 707/920
See application file for complete search history.

(56) References Cited

U.S. PATENT DOCUMENTS

| | | | |
|---|---|---|---|
| 4,737,916 A | 4/1988 | Ogawa | |
| 4,939,662 A | 7/1990 | Numura | |
| 5,389,934 A | 2/1995 | Kass | |
| 5,557,254 A | 9/1996 | Johnson | |
| 5,636,122 A | 6/1997 | Shah | |
| 5,684,951 A | 11/1997 | Goldman | |
| 5,689,269 A | 11/1997 | Norris | |
| 5,689,809 A | 11/1997 | Grube | |
| 5,727,057 A | 3/1998 | Emery | |
| 5,774,824 A | 6/1998 | Streit | |
| 5,801,700 A | 9/1998 | Ferguson | |
| 5,802,492 A | 9/1998 | DeLorme | |
| 5,809,447 A * | 9/1998 | Kato et al. | ..... 701/211 |
| 5,926,118 A | 7/1999 | Hayashida | |
| 5,944,768 A | 8/1999 | Ito | |
| 5,982,301 A | 11/1999 | Ohta | |
| 6,035,253 A | 3/2000 | Hayahi | |
| 6,091,957 A | 7/2000 | Larkins | |
| 6,138,003 A | 10/2000 | Kingdon | |
| 6,169,516 B1 | 1/2001 | Watanabe | |
| 6,182,006 B1 | 1/2001 | Meek | |
| 6,182,227 B1 | 1/2001 | Blair | |
| 6,185,426 B1 | 2/2001 | Alperovich | |
| 6,188,957 B1 | 2/2001 | Bechtolsheim | |
| 6,204,844 B1 | 3/2001 | Fumarolo | |

(Continued)

OTHER PUBLICATIONS

Ahern et al., "World Explorer: Visualizing Aggregate Data from Unstructured Text in Geo-Referened Collections," Jun. 18-23, 2007, ACM, JCDL'07.

(Continued)

*Primary Examiner* — Paul N Dickson
*Assistant Examiner* — Keith Frisby
(74) *Attorney, Agent, or Firm* — William H. Bollman

(57) ABSTRACT

A navigation system written in J2ME MIDP for a client device includes a plurality of media players each respectively comprising a buffer. A navigation program manages the state of the plurality of media players. The plurality of media players are in either one of an acquiring resources state, and a playing and de-allocating state. The use of a plurality of media players each respectively comprising a buffer overcomes the prior art in which navigation system can cut off a voice prompt because of the time-consuming tasks associated with playing a voice prompt.

15 Claims, 3 Drawing Sheets

U.S. PATENT DOCUMENTS

| | | |
|---|---|---|
| 6,249,742 B1 | 6/2001 | Frriederich |
| 6,278,936 B1 | 8/2001 | Jones |
| 6,317,684 B1 | 11/2001 | Roeseler |
| 6,317,687 B1 * | 11/2001 | Morimoto et al. ............ 701/211 |
| 6,321,158 B1 | 11/2001 | DeLorme |
| 6,331,825 B1 | 12/2001 | Ladner |
| 6,366,782 B1 | 4/2002 | Fumarolo |
| 6,366,856 B1 | 4/2002 | Johnson |
| 6,397,143 B1 | 5/2002 | Paschke |
| 6,415,224 B1 | 7/2002 | Wako |
| 6,441,752 B1 | 8/2002 | Fomukong |
| 6,442,384 B1 | 8/2002 | Shah |
| 6,442,391 B1 | 8/2002 | Johansson |
| 6,466,788 B1 | 10/2002 | Carlsson |
| 6,563,824 B1 | 5/2003 | Bhatia |
| 6,571,174 B2 | 5/2003 | Rigazio |
| 6,621,423 B1 | 9/2003 | Cooper |
| 6,640,185 B2 | 10/2003 | Tokota |
| 6,643,516 B1 | 11/2003 | Stewart |
| 6,661,353 B1 | 12/2003 | Gopen |
| 6,665,613 B2 | 12/2003 | Duvall |
| 6,665,715 B1 | 12/2003 | Houri |
| 6,721,652 B1 | 4/2004 | Sanqunetti |
| 6,721,716 B1 | 4/2004 | Gross |
| 6,766,174 B1 | 7/2004 | Kenyon |
| 6,801,850 B1 | 10/2004 | Wolfson |
| 6,810,405 B1 | 10/2004 | LaRue |
| 6,816,782 B1 | 11/2004 | Walters |
| 6,819,919 B1 | 11/2004 | Tanaka |
| 6,820,092 B2 | 11/2004 | Nakano |
| 6,829,532 B2 | 12/2004 | Obradovich |
| 6,839,630 B2 | 1/2005 | Sakamoto |
| 6,842,696 B2 | 1/2005 | Silvester |
| 6,845,321 B1 | 1/2005 | Kerns |
| 6,885,874 B2 | 4/2005 | Grube |
| 6,895,329 B1 | 5/2005 | Wolfson |
| 6,898,516 B2 | 5/2005 | Pechatnikov |
| 6,910,818 B2 | 6/2005 | McLoone |
| 6,925,603 B1 | 8/2005 | Naito |
| 6,934,705 B2 | 8/2005 | Tu |
| 6,944,535 B2 | 9/2005 | Iwata |
| 6,970,871 B1 | 11/2005 | Rayburn |
| 7,058,506 B2 | 6/2006 | Kawase |
| 7,089,110 B2 | 8/2006 | Pechatnikov |
| 7,142,196 B1 | 11/2006 | Connor |
| 7,142,205 B2 | 11/2006 | Chithambaram |
| 7,167,187 B2 | 1/2007 | Scott |
| 7,171,304 B2 | 1/2007 | Wako |
| 7,202,801 B2 | 4/2007 | Chou |
| 7,266,376 B2 | 9/2007 | Nakagawa |
| 7,286,929 B2 | 10/2007 | Staton |
| 7,565,157 B1 | 7/2009 | Ortega |
| 7,653,544 B2 | 1/2010 | Bradley |
| 7,739,033 B2 | 6/2010 | Murata |
| 7,751,614 B2 | 7/2010 | Funakura |
| 7,774,003 B1 | 8/2010 | Ortega |
| 7,822,823 B2 | 10/2010 | Jhanji |
| 7,881,730 B2 | 2/2011 | Sheha |
| 2001/0015756 A1 | 8/2001 | Wilcock |
| 2001/0016849 A1 | 8/2001 | Squibbs |
| 2002/0032036 A1 | 3/2002 | Nakajima |
| 2002/0069239 A1 | 6/2002 | Katada |
| 2002/0086683 A1 | 7/2002 | Kohar |
| 2002/0130906 A1 | 9/2002 | Miyaki |
| 2002/0169539 A1 | 11/2002 | Menard |
| 2003/0014487 A1 | 1/2003 | Iwakawa |
| 2003/0016804 A1 | 2/2003 | Hamada |
| 2003/0032448 A1 | 2/2003 | Bulthuis |
| 2003/0036848 A1 | 2/2003 | Sheha |
| 2003/0036949 A1 | 2/2003 | Kaddeche |
| 2003/0045327 A1 | 3/2003 | Kobayashi |
| 2003/0055555 A1 | 3/2003 | Knockheart |
| 2003/0060938 A1 | 3/2003 | Duvall |
| 2003/0078054 A1 | 4/2003 | Okuda |
| 2003/0125064 A1 | 7/2003 | Koskinen |
| 2003/0126250 A1 | 7/2003 | Jhanji |
| 2003/0149526 A1 | 8/2003 | Zhou |
| 2003/0151501 A1 | 8/2003 | Teckchandani |
| 2003/0165254 A1 | 9/2003 | Chen |
| 2003/0231190 A1 | 12/2003 | Jawerth |
| 2003/0236618 A1 | 12/2003 | Kamikawa |
| 2004/0002814 A1 | 1/2004 | Gogic |
| 2004/0008225 A1 | 1/2004 | Cambell |
| 2004/0021567 A1 | 2/2004 | Dunn |
| 2004/0027258 A1 | 2/2004 | Pechatnikov |
| 2004/0054428 A1 | 3/2004 | Sheha |
| 2004/0124977 A1 | 7/2004 | Biffar |
| 2004/0186880 A1 | 9/2004 | Yamamoto |
| 2004/0204829 A1 | 10/2004 | Endo |
| 2004/0205517 A1 | 10/2004 | Lampert |
| 2004/0215641 A1 | 10/2004 | Kothuri |
| 2004/0220957 A1 | 11/2004 | McDonough |
| 2005/0027445 A1 | 2/2005 | McDonough |
| 2005/0062636 A1 | 3/2005 | Conway |
| 2005/0085999 A1 | 4/2005 | Onishi |
| 2005/0125148 A1 | 6/2005 | Van Buer |
| 2005/0159883 A1 | 7/2005 | Humphries |
| 2005/0188333 A1 | 8/2005 | Hunleth |
| 2005/0219067 A1 | 10/2005 | Chung |
| 2005/0242168 A1 | 11/2005 | Tesavis |
| 2006/0019724 A1 | 1/2006 | Bahl |
| 2006/0041375 A1 | 2/2006 | Witmer |
| 2006/0055693 A1 | 3/2006 | Sylthe |
| 2006/0074547 A1 | 4/2006 | Kaufman |
| 2006/0155679 A1 | 7/2006 | Kothuri |
| 2006/0174209 A1 | 8/2006 | Barros |
| 2006/0200308 A1 | 9/2006 | Arutunian |
| 2006/0200359 A1 | 9/2006 | Khan |
| 2006/0212217 A1 * | 9/2006 | Sheha et al. .................. 701/209 |
| 2006/0223518 A1 | 10/2006 | Haney |
| 2006/0268120 A1 | 11/2006 | Funakura |
| 2006/0270421 A1 | 11/2006 | Phillips |
| 2007/0004461 A1 | 1/2007 | Bathina |
| 2007/0032244 A1 | 2/2007 | Counts |
| 2007/0083911 A1 | 4/2007 | Madden |
| 2007/0139411 A1 | 6/2007 | Jawerth |
| 2007/0208687 A1 | 9/2007 | O'Connor |
| 2007/0219708 A1 | 9/2007 | Brasche |
| 2007/0253642 A1 | 11/2007 | Berrill |
| 2008/0077324 A1 | 3/2008 | Hatano |
| 2008/0129475 A1 | 6/2008 | Breed |
| 2008/0195314 A1 | 8/2008 | Green |
| 2008/0201071 A1 * | 8/2008 | Odinak et al. ................ 701/209 |
| 2008/0220747 A1 | 9/2008 | Ashkenazi |
| 2008/0268822 A1 | 10/2008 | Johnson |
| 2008/0270366 A1 | 10/2008 | Frank |
| 2008/0288166 A1 | 11/2008 | Onishi |
| 2009/0055087 A1 | 2/2009 | Beacher |
| 2009/0113346 A1 | 4/2009 | Wickramasuriya |
| 2009/0177557 A1 | 7/2009 | Klein |
| 2009/0328163 A1 | 12/2009 | Preece |
| 2010/0004993 A1 | 1/2010 | Troy |
| 2010/0042592 A1 | 2/2010 | Stolz |
| 2010/0268848 A1 | 10/2010 | Maurya |

OTHER PUBLICATIONS

Supplementary European Search Report in European Appl. No. 06839236.4 dated Dec. 6, 2010.

Examiner's Report No. 4 on Australian Patent Appl. No. 2004302220 dated Jul. 26, 2010.

Supplementary European Search Report in European Appl. No. 02 75 0138 dated Oct. 13, 2010.

* cited by examiner

STATEFUL, DOUBLE-BUFFERED DYNAMIC NAVIGATION VOICE PROMPTING The present invention claims priority from U.S. Provisional Application No. 60/996,373, entitled "Stateful, Double-Buffered Dynamic Voice Prompting For J2ME (MIDP) Personal Navigation on a Personal Electronic Device" to Eric Wistrand, filed on Nov. 14, 2007, the entirety of which is expressly incorporated herein by reference.

BACKGROUND OF THE INVENTION

1. Field of the Invention

This invention relates generally to wireless telecommunication. More particularly, it relates to wireless carrier location based services (LBS) and J2ME wireless client LBS related software and apparatus.

2. Background of the Related Art

Existing voice navigation systems typically use standard reusable voice prompts preloaded on client devices. These standard voice prompts are usually carefully crafted to be reusable in all situations. All situations match to a pre-loaded or concatenated voice prompt. However, the present inventor has appreciated that such existing navigation systems severely limit product usability and quality due to a compromise in prompt length, scope and quality in order to achieve the timing requirements.

Voice navigation systems written in Java Platform Micro Edition (J2ME) often produce late and missed voice prompts. This sometimes results in the absence of a street name in a voice prompt, e.g., just speaking "Turn Right in 500 feet". The indicated pre-storage voice fragment files are concatenated at the time they are needed. Even the number is pre-stored and concatenated. This results in a situation where the voice prompt is not dynamic and does not have the street names and point-of-interest (POI) name.

Voice prompts in a J2ME navigation system are typically dynamically created (based on the client navigation, the location of the device during navigation) on a voice server and retrieved according to the product requirements. An exemplary product is the TCS Navigator product commercially available from TeleCommunication Systems, Inc. headquartered in Annapolis, Md. This first part, the prompt creation, is performed some time before the actual situation occurs in anticipation of the impending situation requiring a voice prompt. The voice prompt is cached on the client device (phone) for use in the very near future (usually a matter of seconds). This caching process is related to the present invention in that the invention solves a problem occurring upon use of a cached voice prompt.

FIG. 3 illustrates a conventional system for playing navigation voice prompts. In particular, the conventional system for playing navigation voice prompts includes hardware resources 140, asynchronous hardware interface, a media player 10, and a local storage 120. During startup, media player 10 reserves a portion of local storage as a buffer 11. A client navigation program 160 manages the media player 10.

In particular, the problem solved by the present invention comes in the stage when the navigation program 160 must play the voice prompt in a timely manner. Dynamic, location-based voice prompt files are passed from local storage 120 (via a pointer) to the asynchronous hardware interface 130 which must then acquire scarce or exclusive hardware resources 140 to allow the media player 10 to play the voice prompt file. The media player 10 needs to perform a number of time-consuming tasks before it is ready to be started, after receiving the voice prompt file. Additionally, these acquisition tasks must occur sequentially and the various states of the media player 10 must be managed by the client navigation program 160. After playing the voice prompt, the system's media player 10 must then release fully and completely these "scarce or exclusive hardware resources", hardware resources 140, related to the specific voice prompt. This is because the exclusive hardware resources 140 can only be acquired after the handle to a specific voice prompt has been successfully passed into the media player's 10 interface. As a result, a client navigation program 160 may not acquire and hold these exclusive hardware resources 140 and simply replace the voice prompt contained within the hardware resources 140.

As a result, timing is very important in navigation systems, not only for product quality but also for the safety of those using a navigation product. Therefore a client navigation program 160 must play timely and accurate voice prompts.

SUMMARY OF THE INVENTION

In accordance with the principles of the present invention, a navigation system for a client device includes a plurality of media players each respectively comprising a buffer and being in either one of an acquiring resources state, and a voice prompt and de-allocating state. A navigation program manages the states of the plurality of media players.

In accordance with another aspect of the invention, a method of providing a plurality of buffers for a navigation system comprises instantiating a plurality of media players for a client device, each of the media players respectively comprising a buffer. The plurality of media players each have an acquiring resources state, and a voice prompt and de-allocating state. A navigation program is executed to manage the states of the plurality of media players.

DETAILED DESCRIPTION OF ILLUSTRATIVE EMBODIMENTS

The present invention combines both buffering and state transitioning with a threaded wait-state mechanism, together with a dynamic location-based voice prompting navigation system 100 written in Java Platform Micro Edition (J2ME) Mobile Information Device Profile (MIDP) (for personal device navigation).

Figure 1:
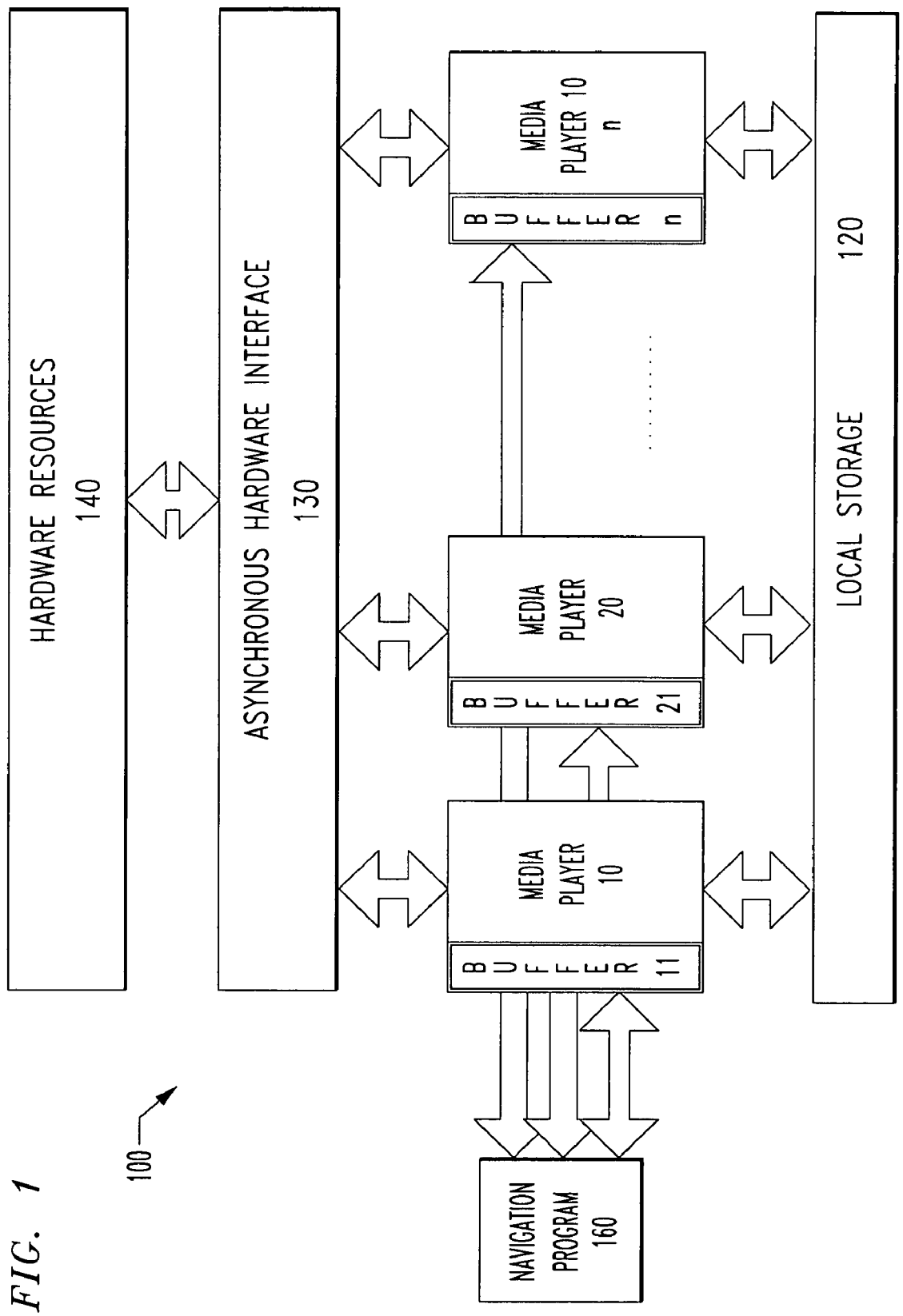
FIG. 1 illustrates a navigation system employing a plurality of buffers, in accordance with the principles of the present invention.

FIG. 1 illustrates a navigation system 100 employing a plurality of buffers, in accordance with the principles of the present invention.

In particular, the navigation system 100 includes hardware resources 140, asynchronous hardware interface 130, a navigation program 160, a plurality of media players 10, 20 ... n, and local storage 120. Each media player 10, 20 ... n has an associated buffer 11, 21 ... n.

In accordance with the principles of the present invention, stateful management of media player 10, 20 ... n exclusive hardware resources 140 is provided using a double buffer (or more buffers depending upon the number of buffers employed) 11, 21 . . . n in, e.g., a J2ME (MIDP) personal navigation program 160.

Any method acting upon the media players 10, 20 . . . n will be asynchronous in fashion by MIDP definition. Notification that certain events have started, completed or failed is satisfied through a listener or callback interface.

Hardware resources 140 may include such hardware as is necessary for the operation of the navigation system 100. Hardware resources 140 may include a display, a graphics processor, a sound processor, a system bus, keypad interface, etc.

Asynchronous hardware interface 130 can allow media players 10, 20 . . . n to interface with hardware resources 130. Being asynchronous, asynchronous hardware interface 130 allows the various components of the navigation system, and in particular, the media players 10, 20 . . . n to operate autonomously with relation to the hardware resources 140. The timing of data passing between the media players 10, 20 . . . n and the hardware resources can be managed by the asynchronous hardware interface 130.

Navigation program 160 can be a J2ME (MIDP) personal navigation program, as is commonly used with compact mobile information devices such as cell phones and Personal Data Assistants (PDAs).

Media players 10, 20 . . . n of navigation program 160 are shown for simplicity as including respective buffers 11, 21 . . . n therein. However, media players 10, 20 . . . n and buffers 11, 21 . . . n can be implemented in local storage 120 and accessed through memory pointers.

Local storage 120 provides memory storage for execution of media players 10, 20 . . . n, storage of voice prompts, storage of navigation history, storage of POI data, storage of user defined destinations, storage of configuration data, etc. The local storage 120 can serve as storage for the navigation system 100 and any other programs and data stored on a client device.

Figure 2:
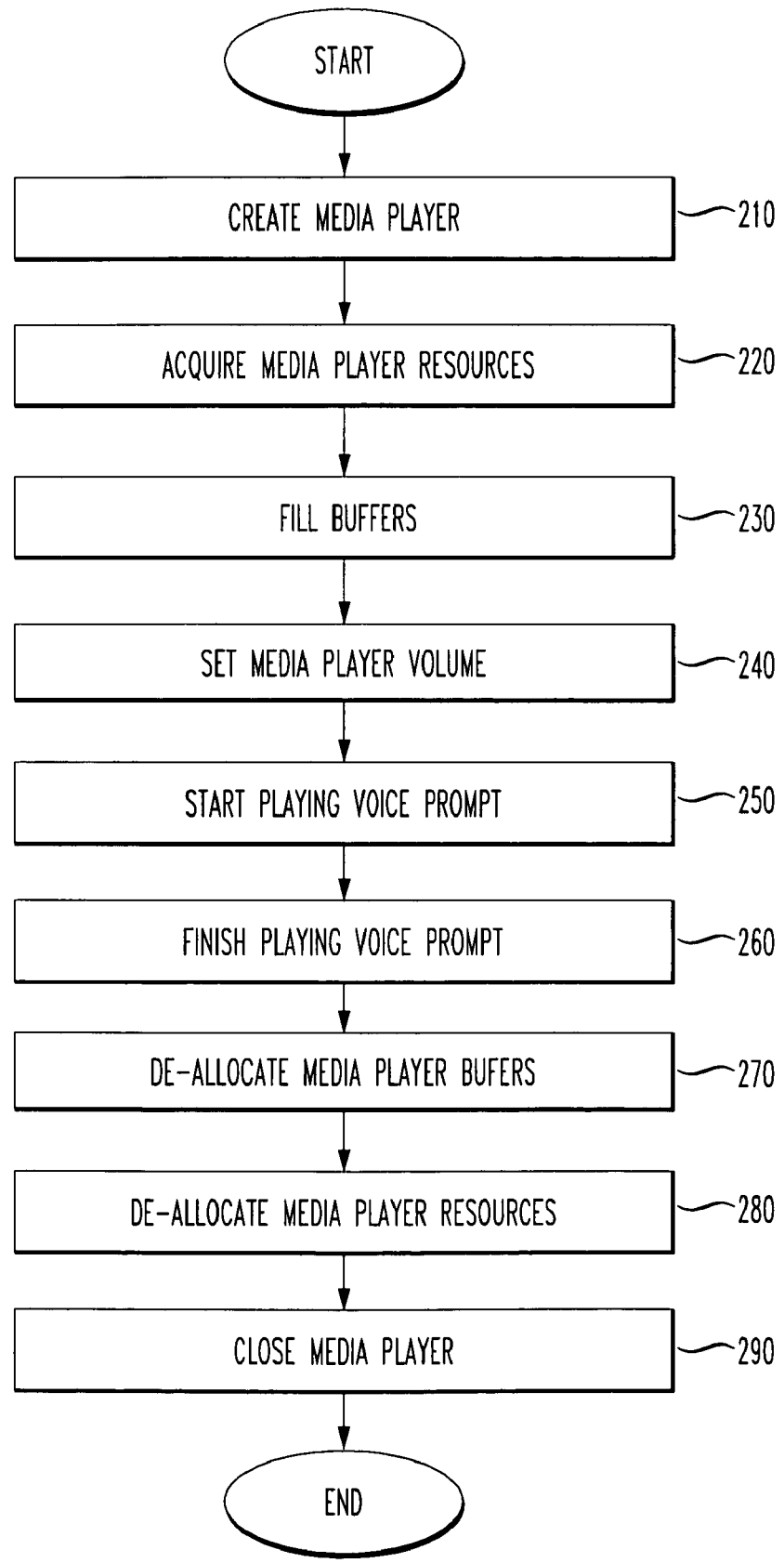
FIG. 2 illustrates a lifecycle of events/states/steps for acquisition of exclusive hardware resources and playing of a voice prompt, in accordance with the principles of the present invention.
Figure 3:
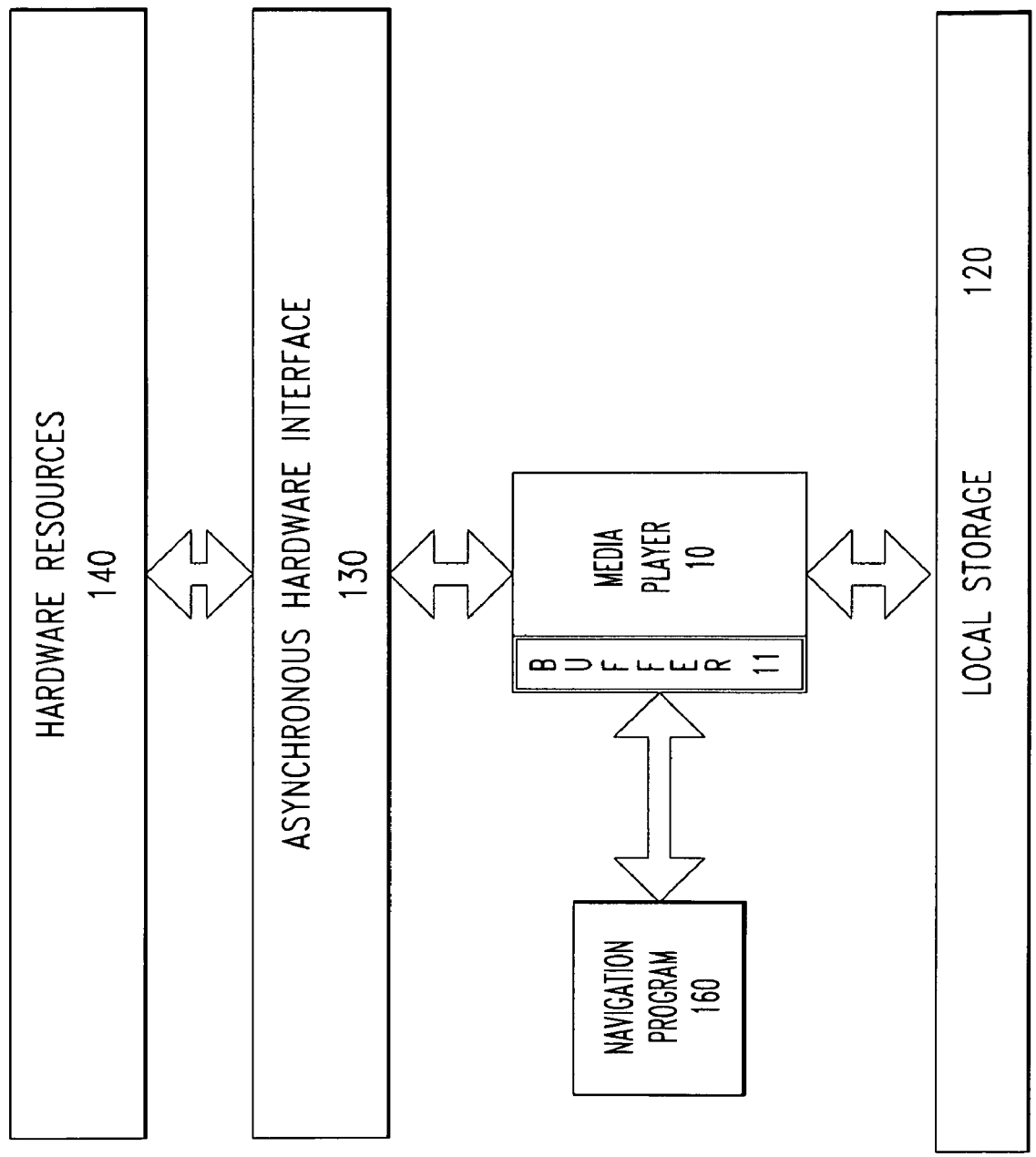
FIG. 3 illustrates a conventional system for playing navigation voice prompts.

FIG. 2 illustrates a lifecycle of events/states/steps for acquisition of exclusive hardware resources 140 and playing of a voice prompt, in accordance with the principles of the present invention.

In event/state/step 210, instances of media players 10, 20 . . . n are created in local storage 120. The media players 10, 20 . . . n are created by resolving a specific voice prompt. Memory space within local storage 120 can be reserved for execution of media players 10, 20 . . . n and their respective buffers 11, 21 . . . n.

In event/state/step 220, the media players 10, 20 . . . n created in step 210 acquire needed hardware resources 140. The media players 10, 20 . . . n can reserve within an operating system exclusive access to the hardware resources 140 to prevent any possible contention to hardware resources 140. Other start-up processing can also occur that can include allocating memory area, testing connectivity to hardware resources 140, etc.

In event/state/step 230, buffers 11, 21 . . . n can be filled with media data, such as a voice prompt.

In event/state/step 240, the volume of media players 10, 20 . . . n can be set. An appropriate control word within media players 10, 20 . . . n can be set that corresponds to an appropriate volume level to prevent media players 10, 20 . . . n from playing a voice prompt at either a too low of a volume or at a too high of a volume.

In event/state/step 250, one of media players 10, 20 . . . n can start playing a voice prompt. The voice prompt can be instructional audio provided by navigation program 160.

In event/state/step 260, the voice prompt played in event/state/step 250 can be finished playing. Upon media players 10, 20 . . . n hitting an end of file designation for a voice prompt, the media players 10, 20 . . . n have an indication to finish playing the voice prompt and move on to event/state/step 270.

In event/state/step 270, the buffers 11, 21 . . . n allocated in local storage 120 in event/state/step 220 can be de-allocated. The memory space previously allocated in local storage 120 for buffers 11, 21 . . . n can be free for use again by any applications and for storage of any data upon de-allocation.

In event/state/step 280, the memory space within local storage 120 allocated in event/state/step 220 for media players 10, 20 . . . n can be de-allocated. The memory space previously allocated in local storage 120 for media players 10, 20 . . . n can be free for use by any applications and for storage of any data upon de-allocation.

In event/state/step 290, any open media players 10, 20 . . . n that have their associated resources de-allocated and buffers de-allocated can be closed.

Two (or more) media player 10, 20 . . . n buffers 11, 21 . . . n are created upon navigation program 160 startup and remain throughout the navigation session. Due to the inevitable multi-threaded situation of voice prompt navigation these media players 10, 20 . . . n are forced to be in only one of two general events/states/steps during voice prompt execution. They are either in the event/state/step of acquiring resources (during events/states/steps 210 through 240) or they are playing and de-allocating (events/states/steps 250 through 290). As soon as a media player 10, 20 . . . n has been given the start command (the cause of event/state/step 250) it switches from the acquiring hardware resources 140 events/states/steps 210 through 240 to the playing and de-allocating hardware resources 140 events/states/steps 250 through 290.

During and between events/states/steps 210 through 250, a waiting mechanism (not shown) is employed to guarantee proper transitions from one event/state/step to the next. If the transitions are not made properly and in the correct order a media player 10, 20 . . . n error event will occur and be handled accordingly. This mechanism does not effect other navigator program 160 processes and there execution while it is waiting for the media player 10, 20 . . . n to react.

Either of the media players 10, 20 . . . n may be acted upon by a different user program thread or process during almost any of the various events/states/steps 210-290. The most used scenario with regard to this feature is the act of stopping a Voice Prompt while it is playing.

The actual double-buffing, or plural-buffering if three or more media players 10, 20 . . . n are enacted, occurs when one media player, e.g., 10, is generally in the playing and de-allocating event/state/step and the another media player, e.g., 20, is at the same time acquiring resources. Due to the asynchronous nature of the media player 10, 20 . . . n hardware resources 140 and the nature of the navigation location-based voice prompts, it is evident that these media players 10, 20 . . . n will be active at the same moment in differing generalized states during much of a navigation session, even in cases where the calling (program) methods are not re-entrant in nature.

Benefits of the invention include dynamic voice prompting in a personal navigation program 160, such as streets and POI names. It also results in better error handling which prevents corruption and slow down of media players 10, 20 . . . n. Faster voice processing results, as does a better user experience, because it dynamically gives you voice prompt 'according to your current surroundings'.

The invention has applicability with any company creating a navigation program 160 on a personal device written in J2ME for the MIDP. It also has applicability in a J2ME personal navigation device with dynamic voice prompting, dynamic meaning in this instance not pre-stored in memory when the application is loaded onto the navigation device.

While the invention has been described with reference to the exemplary embodiments thereof, those skilled in the art will be able to make various modifications to the described embodiments of the invention without departing from the true spirit and scope of the invention.

What is claimed is:

1. A physical navigation system, comprising:
   a plurality of media players, associated with physical hardware resources, each respectively comprising a buffer, and each having an acquiring resources state, and a voice prompt and de-allocating state; and
   a navigation program to manage said acquiring resources state, and said voice prompt and de-allocating state in each of said plurality of media players; and
   a physical asynchronous hardware interface to interface said plurality of media players to said physical hardware resources;
   wherein said plurality of media players operate autonomously with relation to said physical hardware resources via said physical asynchronous hardware interface.

2. The physical navigation system according to claim 1, wherein:
   said voice prompt is dynamically created based on a changing location of said client device.

3. The physical navigation system for according to claim 1, wherein:
   said navigation system is written in Java Platform Micro Edition (J2ME) Mobile Information Device Profile (MIDP).

4. The physical navigation system according to claim 1, wherein:
   said plurality of media players interface with hardware resources via an asynchronous hardware interface.

5. The physical navigation system according to claim 1, wherein:
   said navigation system is implemented in a personal data assistant (PDA).

6. The physical navigation system according to claim 1, wherein:
   said navigation system is implemented in a cellular phone.

7. The physical navigation system according to claim 1, wherein:
   said navigation system is multi-threaded.

8. A method of providing a plurality of buffers for a physical navigation system, comprising:
   instantiating a plurality of media players, associated with physical hardware resources, each of said media players respectively comprising a buffer, and each having an acquiring resources state, and a voice prompt and de-allocating state;
   executing a navigation program to manage said acquiring resources state, and said voice prompt and de-allocating state in each of each of said plurality of media players; and
   interfacing said plurality of media players to said physical hardware resources via a physical asynchronous hardware interface;
   wherein said plurality of media players each have an acquiring resources state, and a voice prompt and de-allocating state; and
   wherein said plurality of media players operate autonomously with relation to said physical hardware resources via said physical asynchronous hardware interface.

9. The method of providing a plurality of buffers for a physical navigation system according to claim 8, further comprising:
   allocating media player resources;
   filling buffers associated with each of said plurality of media players;
   setting a volume for said plurality of media players;
   playing said voice prompt;
   de-allocating said buffers associated with each of said plurality of media players;
   de-allocating said media player resources; and
   closing each of said plurality of media players.

10. The method of providing a plurality of buffers for a physical navigation system according to claim 8, wherein:
    said voice prompt is dynamically created based on a changing location of said client device.

11. The method of providing a plurality of buffers for a physical navigation system according to claim 8, wherein:
    said navigation system is written in Java Platform Micro Edition (J2ME) Mobile Information Device Profile (MIDP).

12. The method of providing a plurality of buffers for a physical navigation system according to claim 8, further comprising:
    interfacing said plurality of media players with hardware resources via an asynchronous hardware interface.

13. The method of providing a plurality of buffers for a physical navigation system according to claim 8, wherein:
    said navigation system is implemented in a personal data assistant (PDA).

14. The method of providing a plurality of buffers for a physical navigation system according to claim 8, wherein:
    said navigation system is implemented in a cell phone.

15. The method of providing a plurality of buffers for a physical navigation system according to claim 8, further comprising:
    multi-threading said navigation system.

* * * * *